United States Patent [19]
Morimoto

[11] Patent Number: 5,729,287
[45] Date of Patent: Mar. 17, 1998

[54] DRIVING METHOD FOR DRIVING A SOLID STATE IMAGE PICK-UP DEVICE

[75] Inventor: Michihiro Morimoto, Tokyo, Japan

[73] Assignee: NEC Corporation, Tokyo, Japan

[21] Appl. No.: 699,389

[22] Filed: Aug. 19, 1996

[30] Foreign Application Priority Data

Aug. 22, 1995 [JP] Japan .................................. 7-213546

[51] Int. Cl.⁶ .................................................. H04N 5/335
[52] U.S. Cl. ............................................. 348/241; 348/314
[58] Field of Search .................................. 348/241, 250, 348/314, 311; H04N 5/335

[56] References Cited

U.S. PATENT DOCUMENTS

| | | | |
|---|---|---|---|
| 4,626,915 | 12/1986 | Takatsu | 348/304 |
| 5,339,162 | 8/1994 | Tani | 348/250 |
| 5,382,978 | 1/1995 | Tanaka | 348/314 |

FOREIGN PATENT DOCUMENTS

| | | | |
|---|---|---|---|
| 2-229469 | 9/1990 | Japan | H04N 5/335 |
| 4-341075 | 11/1992 | Japan | H04N 5/335 |
| 5-130511 | 5/1993 | Japan | H04N 5/335 |

OTHER PUBLICATIONS

"A Photoelectric Conversion–Characteristic Control Method for Interline Transfer CCD Imager", Endo et al., IEEE Transactions on Electron Devices, vol. ED–32, No. 8, Aug. 1985, pp. 1511–1513.

Primary Examiner—Wendy Garber
Attorney, Agent, or Firm—Young & Thompson

[57] ABSTRACT

In a solid state image pick-up device having a vertical overflow drain structure, a voltage to be applied to a semiconductor substrate is lowered in stepwise manner during a period, in which a charge photoelectrically converted by a photodiode is accumulated in the photodiode. Expansion of a dynamic range relative to an incident light intensity can be realized without performing high speed transfer in a vertical CCD register. Then, lowering power consumption and lowering of noise of the solid state image pick-up device becomes possible.

5 Claims, 13 Drawing Sheets

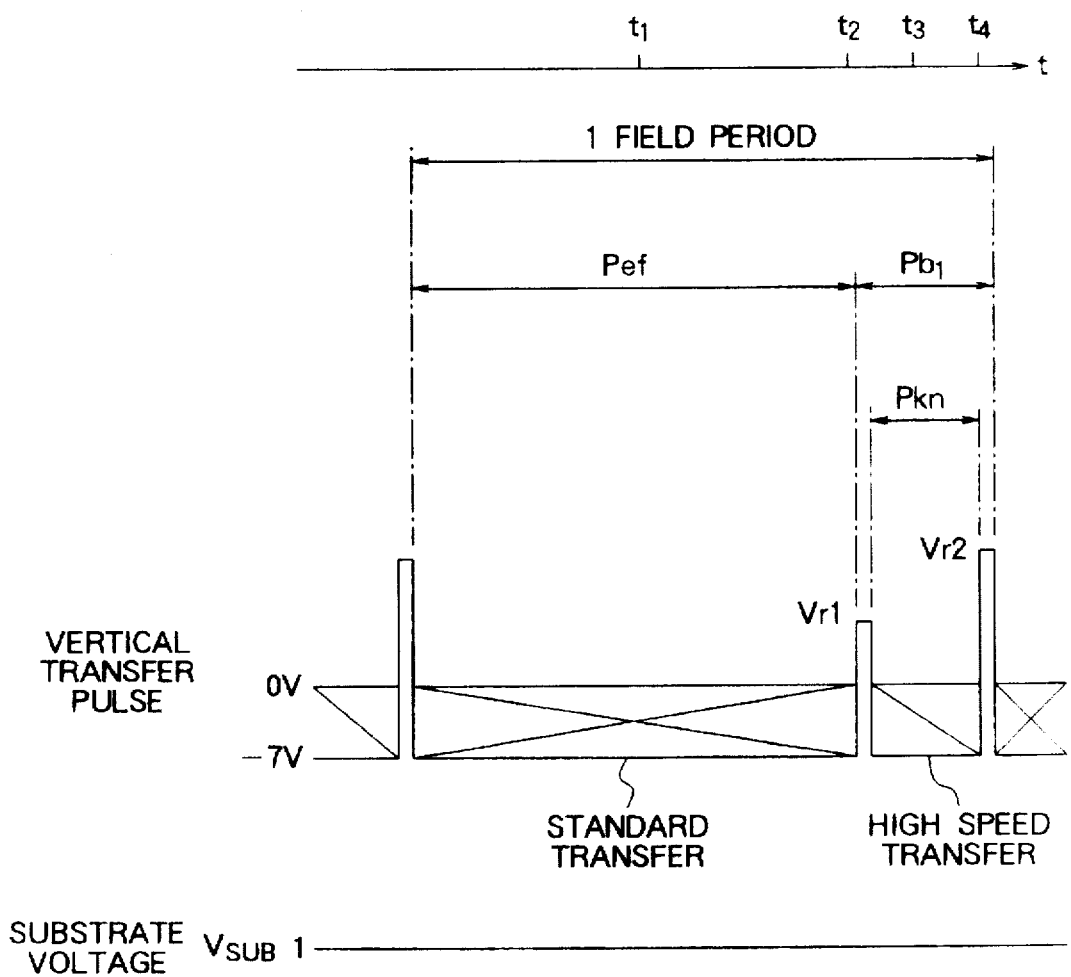

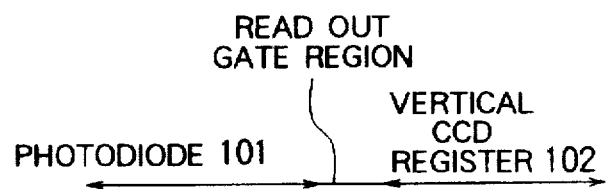
FIG. 7A   t=ta
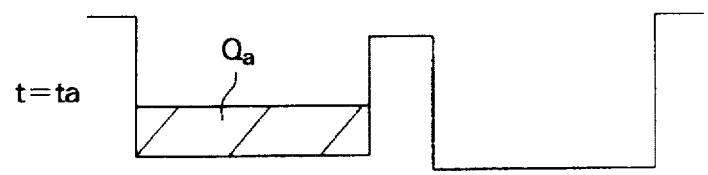
FIG. 7B   t=tb
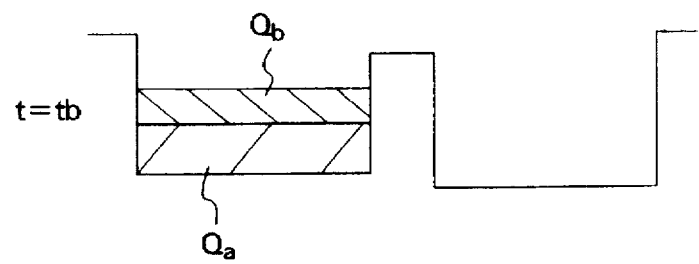
FIG. 7C   t=tr

DRIVING METHOD FOR DRIVING A SOLID STATE IMAGE PICK-UP DEVICE

BACKGROUND OF THE INVENTION

1. Field of the Invention

The present invention relates to a driving method for a CCD type solid state image pick-up device. More specifically, the invention relates to a voltage charging method to a semiconductor substrate for expanding dynamic range in relation to an incident light intensity.

2. Description of the Related Art

FIG. 1 is an illustration showing a construction of the conventional interline transfer type CCD image pick-up device. The interline transfer type CCD image pick-up device is constructed with a plurality of photodiodes 101, a vertical CCD register 102 transferring a charge received from the photodiodes 101 in vertical direction, a horizontal CCD register 103 transferring the charge received from the vertical CCD register 102 in horizontal direction, a charge detecting portion 104 for detecting the charge transferred from the horizontal CCD register 103, and an output amplifier 105. In FIG. 1, surrounded by dotted line is a unit pixel 106.

Next, a construction of the unit pixel 106 will be discussed. FIG. 2 is a section showing a structure as cut the unit pixel 106 in FIG. 1 in horizontal direction.

On a major surface of an N-type semiconductor substrate 111, a P-type impurity well layer 112 is formed. An N-type impurity layer 113 forming the photodiode 101 is formed in the P-type impurity well layer 112 and a P$^+$-type impurity layer 114 restricting generation of a dark current on the surface is formed on the surface of the N-type impurity layer 113. Also, an N-type impurity layer 115 forming the vertical CCD register 102 and a lower P-type impurity layer 116 are formed in the P-type impurity well layer 112.

Between the photodiode 101 and the vertical CCD register 102, a P$^+$-type isolation layer 117 and a read out gate region 118 for transferring the charge from the photodiode 101 to the vertical CCD register 102 are provided. It should be noted that at a portion of the read out gate region 118 located in the vicinity of the substrate surface, an additional impurity layer (not shown) may be formed for adjustment of a threshold voltage.

On one major surface of the semiconductor substrate 111, insulation layer 119 consisted of silicon dioxide layer or silicon nitride layer and so forth is formed. A vertical transfer electrode 120 consisted of a polycrystalline silicon layer and so forth is formed on the insulation layer 119. It should be noted that a part of the vertical transfer electrode 120 serves as a control electrode for switching the read out gate region 118 ON and OFF. Furthermore, a light shielding layer (not shown) consisted of tungsten layer or aluminum layer is formed over the vertical transfer electrode 120 via an insulation layer (not shown) consisted of silicon dioxide layer. A cover layer (not shown) consisted of silicon dioxide layer is further formed thereover.

In the meanwhile, in the recent solid state image pick-up device, it has been implemented to form a micro-lens above the photodiode to virtually increase an open area of the photodiode to improve sensitivity in order to compensate reduction of incident light to the photodiode associated with reduction of the area of the photodiode for higher density of the pixels. However, in contrast to this, under the condition where the capacity of the photodiode is the same, the photodiode may saturated at lower incident light intensity.

Namely, a problem of narrow dynamic range is encountered. As a solution for this, there has been proposed a method in IEEE TRANSACTIONS OF ELECTRON DEVICES, Vol. ED-32, No. 8, 1985, pp 1511 to 1513. Discussion will now be given for the conventional driving method for expanding dynamic range relative to the incident light intensity on the basis of the above-identified publication.

FIG. 3 is an illustration showing a driving method in the conventional solid state image pick-up device shown in FIG. 2 and is a timing chart of a clock pulse waveform charged to the vertical transfer electrode 120 and a voltage waveform charged to the N-type semiconductor substrate 111.

It should be noted that the P-type impurity well layer 112 is grounded and respective voltages are expressed with reference to the potential of the grounded potential of the P-type impurity well layer 112. On the other hand, FIGS. 4A to 4D are diagrammatic illustration showing accumulating condition of charge within the photodiode 101 and the vertical CCD register 102 at a time of t1 to t4. At an arbitrary timing t1 in a vertical effective period Pef accumulating the charge photoelectrically converted by the photodiode, a charge Q1 is accumulated only in the photodiode, as shown in FIG. 4A. It should be noted that in the vertical CCD register, a charge read out from the photodiode to the vertical CCD register in an immediately preceding field is transferred. Transfer is performed at a frequency of 15.7 kHz, for example. Here, such transfer is referred to as standard transfer.

At an initial timing t2 of vertical blanking period Pb1, a read out pulse Vr1 is applied to the vertical transfer electrode 120 for reading out a part Q2 of the charge accumulated in the photodiode to the vertical CCD register, as shown in FIG. 4B. It should be noted that a charge not read out and residing in the photodiode is assumed as Q3. Subsequently, at an arbitrary timing t3 of a period Pkn between the read out pulses Vr1 and Vr2 during the vertical blanking period, a charge Q4 newly photoelectrically converted is accumulated superimposing to Q3, as shown in FIG. 4C. It should be noted that, at this time, in the vertical CCD register, the charge Q2 read out at the timing t2 is swept to a drain (not shown) provided at upper or lower portion of an image region by 2 MHz of high speed transfer.

At the end timing t4 of the vertical blanking period, the read out pulse Vr2 is applied to the vertical transfer electrode 120, as shown in FIG. 4D. Then, all of the charge (Q3+Q4) accumulated in the photodiode is read out to the vertical CCD register 102. The read out charge is sequentially transferred to the horizontal CCD register 103 during the vertical effective period of the next field, and output via the charge detecting portion 104 and the output amplifier 105.

FIG. 5 is a diagrammatic illustration showing a photo-electric conversion characteristics in the case where driving for expanding the dynamic range is performed on the basis of FIG. 3. For comparison, the characteristics in the case where driving in typical manner is also shown.

It should be noted that, normally, the saturation capacity of the vertical CCD register is set to be slightly greater than that of the photodiode, the output should be elevated slightly even when the photodiode is saturated, actually. However, for simplification of disclosure, it is assumed that the output becomes constant value V1 after saturation of the photodiode, in the following discussion. Also, while not illustrated on the drawing, in typical method of driving, at an arbitrary timing within the vertical blanking period, all of the charge in the photodiode is read out to the vertical CCD register, only once.

As shown in FIG. 5, when typical method driving is performed, the photodiode is just saturated in the incident light intensity L1. With taking the incident light intensity L1 as knee point K1, an output V1 becomes constant with respect to a light intensity region higher than or equal to the incident light intensity L1. In other words, the output linearly corresponding to the incident light intensity can be obtained only up to the incident light intensity L1. In short, the dynamic range relative to the incident light intensity is up to L1.

On the other hand, the knee point K2 of a curve in the driving method for expanding the dynamic range corresponds to that of lower incident light intensity than that of the knee point K1 in the case where typical driving method is taken. An output V2 corresponding to the incident light intensity L2 corresponds to a maximum charge amount which can be accumulated in the photodiode upon charging the read out pulse V2. On the other hand, a gradient of the curve in a range of incident light intensity L2 to L3 is smaller for the rate of Pkn/(Pef+Pkn) shown in FIG. 3, in comparison with the gradient of the curve in a range lower than or equal to the incident light intensity L2.

As set forth above, by making the gradient smaller in a range where the incident light intensity is large, linear output can be obtained at higher incident light intensity in comparison with the typical method of driving. Namely, the dynamic range relative to the incident light intensity is expanded, and thus the dynamic range is expanded up to the incident light intensity L3, in the case of FIG. 5.

However, in the method disclosed in IEEE TRANSACTION ON ELECTRON DEVICES, Vol. ED-32, No. 8, 1985, pp 1511 to 1513, a part of charge initially read out within the vertical blanking period is required to be swept to the drain in high speed transfer to encounter a problem of large power consumption.

In the publication, high speed transfer at 2 MHz is performed in a period of 800 μsec per one field period (1/60 sec). On the other hand, when 2:1 interlace driving is performed in NTSC corresponding solid state image pick-up device, standard transfer frequency is about 15.7 kHz, and thus the transfer is performed within about 15.5 msec per one field period. In consideration to this, and in case that vertical drive pulse amplitudes are equal in standard transfer and high speed transfer, power consumption in the vertical CCD register performing high speed transfer becomes about seven times of the standard transfer. For example, in the solid image pick-up device having the vertical CCD register on the basis of the normal driving method, and in the solid state image pick-up device, which power consumption of the vertical CCD register is 4 mW, the power consumption of the horizontal CD register is 40 mW and the power consumption of the output amplifier is in the order of 45 mW, when high speed transfer is performed, the total power consumption is increased from 89 mW to 113 mW. By this, a device temperature is elevated not a little to cause a problem of large level of dark current or white defects.

On the other hand, another method for expanding the dynamic range has been disclosed in Japanese Unexamined Patent Publication (Kokai) No. Heisei 1-253960. This method utilizes a fact that in the region higher than or equal to the incident light intensity where photodiode is saturated, the output voltage component higher than or equal to saturation voltage is proportional to logarithm of a light current flowing through the substrate. Photoelectric conversion characteristics of output is switched depending upon whether the incident light amount is lower than or equal to the photodiode saturation region or higher than or equal to the photodiode saturation region.

However, in the method disclosed in Japanese Unexamined Patent Publication No. Heisei 1-253960, since the light current flows through the substrate, it becomes difficult to detect the light current in respective pixels when the substrate of respective pixels are common as in the solid state image pick-up device shown in FIG. 1.

SUMMARY OF THE INVENTION

It is an object of the present invention to provide a method for driving a solid state image pick-up device which can expand a dynamic range without increasing power consumption and reduce a noise level.

The problem set forth above can be solved by expanding a dynamic range relative to an incident light intensity without performing high speed transfer. The present invention is worked out in this view point.

A solid state image pick-up device for practicing the method of the present invention includes:

a first conductive type semiconductor substrate;

a second conductive type impurity well layer;

a plurality of photodiodes;

a vertical CCD register receiving a charge of said photodiodes for transferring the same;

a horizontal CCD register receiving a charge from said vertical CCD register and transferring the same;

a charge detecting portion formed within said impurity well layer and detecting the charge from said horizontal CCD register;

an output amplifier provided within said semiconductor substrate; and vertical overflow drain means for sweeping an excessive charge within respective photodiode to said semiconductor substrate.

Such a solid state image pick-up device has:

a junction depth of a second conductive type impurity well, in which said output amplifier and said charge detecting portion are formed, being 5 to 10 μm, and an average concentration of impurity being $1\times10^{15}$ to $1\times10^{16}$ cm$^{-3}$.

A driving method for driving said solid state image pick-up device according to the present invention comprises a step of:

lowering a charge voltage of said semiconductor substrate within a period, in which a charge photoelectrically converted by said photodiode is accumulated in said photodiode.

In this case, during a period, in which a charge photoelectrically converted by said photodiode is accumulated in said photodiode, the charge voltage for the semiconductor substrate may be lowered in stepwise fashion.

Alternatively, during a period, in which a charge photoelectrically converted by said photodiode is accumulated in said photodiode, the voltage to be applied to the semiconductor substrate may be lowered linearly.

In either case, said charge voltage of said semiconductor substrate is lowered to a blooming restricting voltage for preventing occurrence of photodiode blooming.

The operation of the present invention constructed as set forth above will be discussed. Normally, the substrate voltage can be set at a voltage capable of preventing photodiode blooming. The photodiode blooming is that when the excessive charge is occurred in the photodiode, the charge leaks from the photodiode to the vertical CCD register before actual reading out. As one of methods preventing occurrence of photodiode blooming, there is a vertical overflow drain structure. This is the structure to sweep out the excessive charge generated in the photodiode into the N-type semiconductor substrate before leaking into the vertical CCD register. The substrate voltage upon performing sweeping operation is the blooming restriction voltage.

In the present invention, an operation for removing a part of the charge in the photodiode as set forth above causes variation of the substrate voltage within the accumulation period to sweep the excessive charge to the semiconductor substrate. Therefore, high speed transfer of the vertical CCD register becomes unnecessary to avoid increasing of power consumption.

In the meanwhile, associating with variation of the substrate voltage, it is possible that the upper region of the image becomes bright and the lower region of the image becomes dark in the reproduced image to cause contrast step difference. In order to avoid occurrence of contrast step difference in the reproduced image associated with variation of the substrate voltage, the substrate voltage varied detection of the charge.

In view of this, a driving method for driving a solid state image pick-up device according to another aspect of the present invention is characterized in that a pulse voltage is applied to said semiconductor substrate for sweeping a part of charge in said photodiode to said semiconductor substrate during an arbitrary horizontal blanking period in a period, in which a charge photoelectrically converted by said photodiode is accumulated in said photodiode.

In this case, the pulse voltage to be applied to the semiconductor substrate may be set higher than the blooming restriction voltage preventing photodiode blooming.

As set forth above, by applying the pulse voltage to the semiconductor substrate during the arbitrary horizontal blanking period, the substrate voltage will never varied during detection of the charge. Accordingly, even when fluctuation of the operation point of the output amplifier or fluctuation of capacity of the charge detecting portion is caused by applying of the pulse voltage to said substrate, contrast step difference may never be caused on the reproduced image.

On the other hand, the solid state image pick-up device for preventing occurrence of contrast step difference , according to the present invention, is characterized in that a junction depth of a second conductive type impurity well, in which said output amplifier and said charge detecting portion are formed, is 5 to 10 μm, and an average concentration of impurity is $1 \times 10^{15}$ to $1 \times 10^{16}$ cm$^{-3}$.

Since influence of shape of depletion layer in the vicinity of the surface of the well depending upon variation of the substrate voltage can be avoided, fluctuation of the operation point of the output amplifier or fluctuation of capacity of the charge detecting portion can be successfully avoided.

According to the present invention, the operation for removing a part of charge in the photodiode is performed by sweeping to the semiconductor substrate by varying the substrate voltage within the charge accumulating period in the photodiode. Thus, high speed transfer of the vertical CCD register becomes unnecessary to avoid increasing of the power consumption. Therefore, dynamic range can be expanded without causing elevation of dark current level and white defect level due to heating of the device.

On the other hand, by sweeping a part of charge to the semiconductor substrate by applying the pulse voltage during arbitrary horizontal blanking period in the charge accumulation period, variation of the substrate voltage will never be caused during detection of the charge. Accordingly, even when fluctuation of the operation point of the output amplifier or fluctuation of capacity of the charge detecting portion is caused by the applying of the pulse voltage to the substrate, the contrast step difference on the reproduced image may not be caused.

Furthermore, by setting the depth of the well layer at 5 to 10 μm, where the output amplifier and the charge detecting portion are provided, and by setting the average concentration of the impurity at $1 \times 10^{15}$ to $1 \times 10^{16}$ cm$^{-3}$, influence of the shape of the void layer in the vicinity of the channel portion due to variation of the substrate voltage can be avoided to prevent fluctuation of the operation point of the output amplifier or fluctuation of capacity of the charge detecting portion. By this, contrast step difference on the reproduced image may not be caused.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 3 is a timing chart showing a clock pulse waveform charged on a vertical transfer electrode 120 in the conventional driving method and a voltage waveform charged in N-type semiconductor substrate 111;

FIGS. 7A, 7B and 7C are diagrammatic illustration showing a charge accumulating condition in a photodiode 101 and the Vertical CCD register 102 at respective timing ta, tb and tr of FIG. 6;

DESCRIPTION OF THE PREFERRED EMBODIMENT

Figure 1:
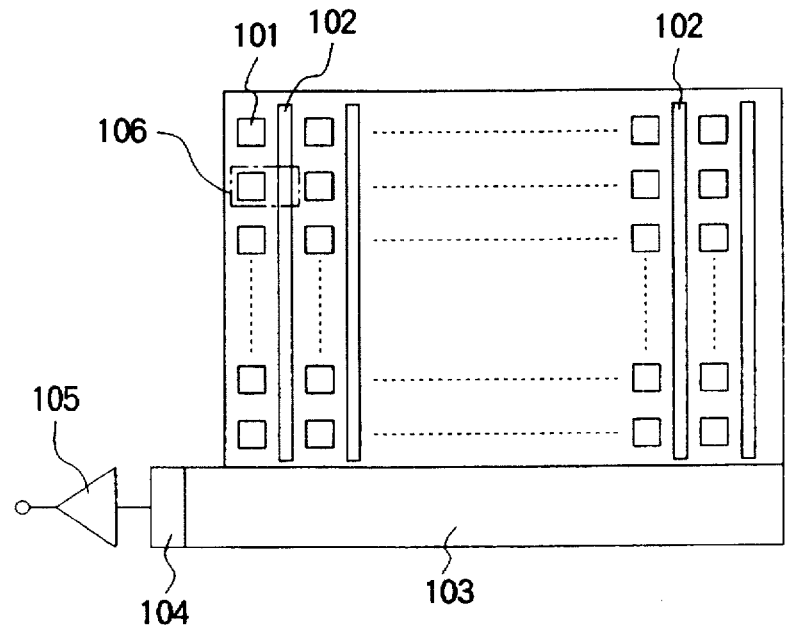
FIG. 1 is an illustration showing a construction of the conventional interline transfer type CCD image pick-up device.
Figure 2:
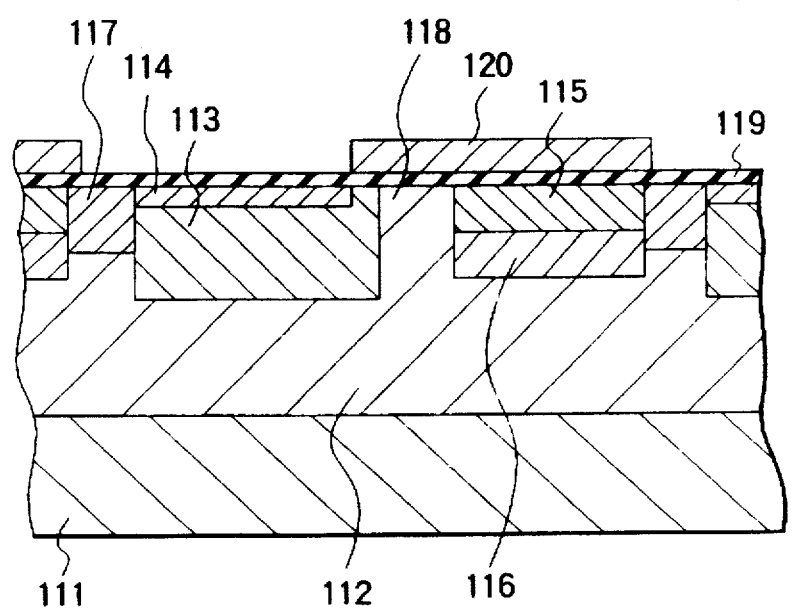
FIG. 2 is a section of a unit pixel 106 in horizontal direction.
Figure 4A:
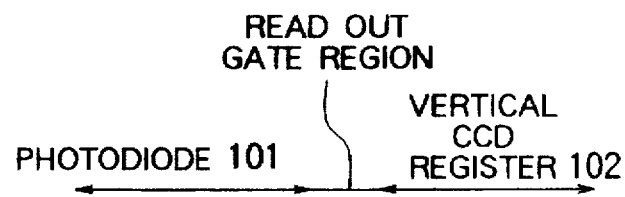
FIGS. 4A to 4D are diagrammatic illustration showing an accumulating condition of a charge in a photodiode 101 and a vertical CCD register 102 at a timing t1 to t4 in FIG. 3.
Figure 4B:
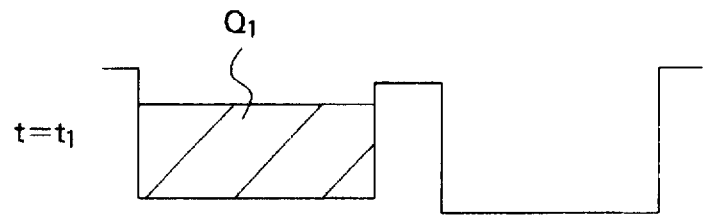
Figure 4C:
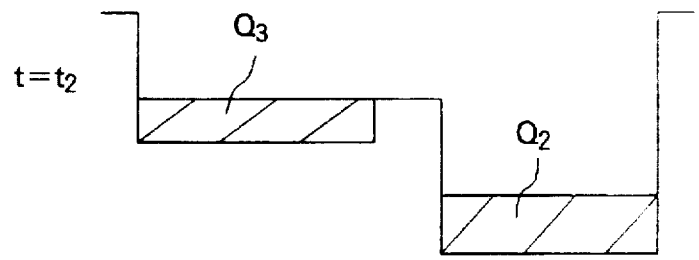
Figure 4D:
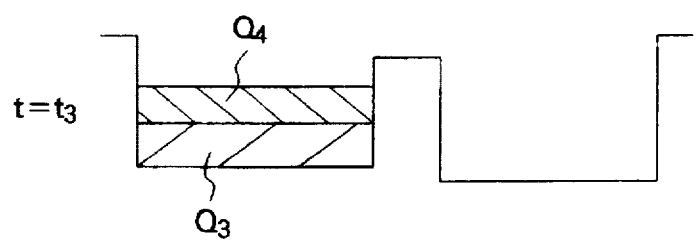

Next, the preferred embodiments of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention. It should be noted that the shown embodiment relates to a driving method of a solid state image pick-up device employing unit pixel of the solid state image pick-up device having a structure similar to that shown in FIGS. 1 and 2. In the following disclosure, like elements to those in FIGS. 1 and 2 will be identified by like reference numerals.

Figure 6:
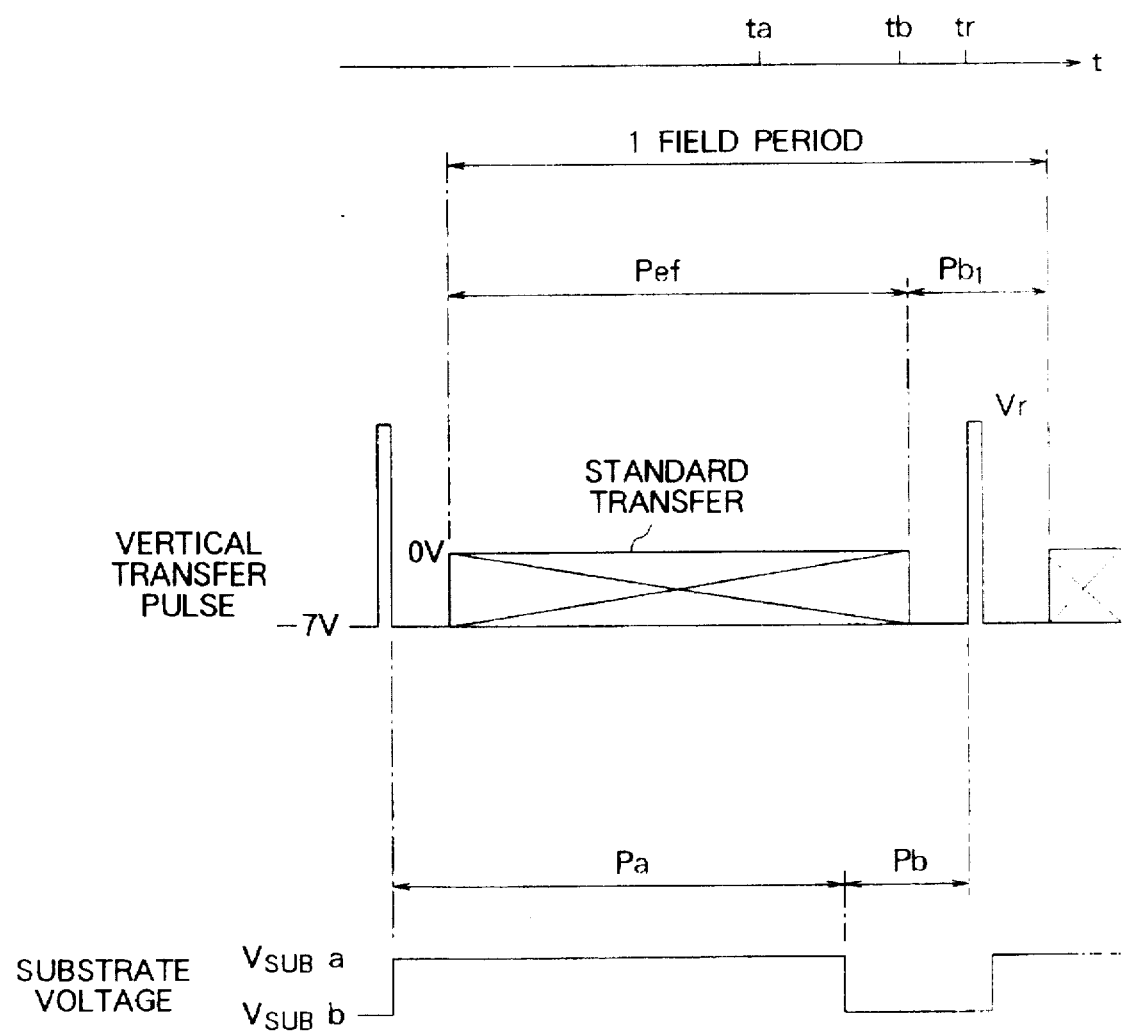
FIG. 6 is a timing chart showing a clock pulse waveform applied on a vertical transfer electrode 120 in the first embodiment of a driving method of a solid state image pick-up device according to the present invention and a voltage waveform applied in N-type semiconductor substrate 111.

FIG. 6 is a timing chart showing a clock pulse waveform charged on a vertical transfer electrode 120 in the first embodiment of a driving method of a solid state image pick-up device according to the present invention and a voltage waveform charged in an N-type semiconductor substrate 111. It should be noted that the P-type impurity well 112 is grounded. Respective voltages will be expressed with reference to this potential. FIGS. 7A to 7C are diagrammatic illustration showing a charge accumulating condition in a photodiode 101 and the Vertical CCD register 102 at respective timing ta, tb and tr of FIG. 6.

During a period Pa, a substrate voltage VSUBa is charged. At an arbitrary timing ta within the period Pa, among a charge photoelectrically converted by the photodiode 101, as shown in FIG. 7A, a charge Qa not swept into the substrate is accumulated. It should be noted that, at this time, in the vertical CCD register 102, a charge read out to the vertical CCD register 102 from the photodiode 101 in the immediately preceding field is transferred.

In a subsequent period Pb, a substrate voltage VSUBb which is lower than the substrate voltage VSUBa is applied.

At an arbitrary period tb within the period Pb, as shown in FIG. 7B, among a charge photoelectrically converted from initiating timing of the period Pb to the timing tb, a charge Qb not swept out to the substrate is accumulated in the photodiode 101 superimposing to the charge Qa.

At an arbitrary timing tr within the vertical blanking period Pb1, as shown in FIG. 7C, a read out pulse Vr is applied to the vertical transfer electrode 120, and the overall charge (Qa+Qb) accumulated in the photodiode 101 is read out to the vertical CCD register 102. It should be noted that a voltage of the read out pulse Vr is similar to the voltage of the read out pulse Vr2 in FIG. 3. The read out charge is transferred to the horizontal CCD register 113 during the vertical effective period for the next field, sequentially and then output via the voltage detecting portion 104 and the output amplifier 105.

Figure 8:
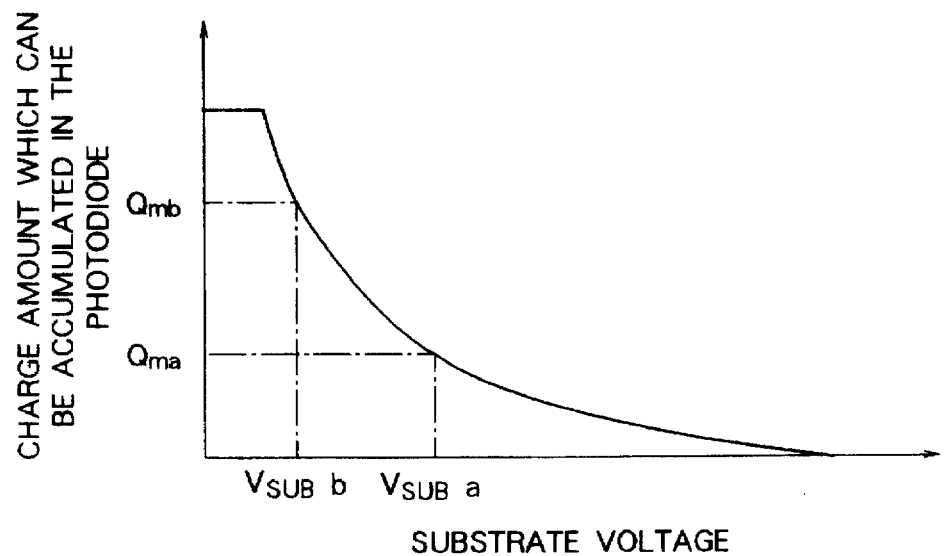
FIG. 8 is an illustration showing a substrate voltage dependency of a charge amount which can be accumulated in the photodiode.

Here, discussion will be given for relationship between the substrate voltages VSUBa and VSUBb and the charges Qa and Qb. FIG. 8 shows a substrate voltage dependency of a charge amount which can be accumulated in the photodiode. Normally, the substrate voltage is set at a voltage capable of preventing the photodiode from causing blooming. The photodiode blooming is a phenomenon to cause leakage of a charge from the photodiode to the vertical CCD register before actual read out period when excessive charge is generated in the photodiode, and is observed as white line in the vertical direction on the reproduced image.

As one of methods for preventing occurrence of the photodiode blooming is a vertical overflow drain structure. This structure lowers a potential barrier at the portion of the P-type impurity well layer 112 below the N-type impurity layer 113 constructing the photodiode 101 by elevating the substrate voltage, when the excessive charge are produced in the photodiode 101, so that the charge can be swept to the N-type semiconductor substrate 111 before leaking into the vertical CCD register 102. In the shown embodiment, a blooming restriction voltage is VSUBb. It should be noted that the VSUB1 in the conventional solid state image pick-up device shown in FIG. 3 is similar to VSUBb.

As can be seen from FIG. 8, by rising the substrate voltage, the charge amount which can be accumulated in the photodiode is reduced. Since VSUBa is applied during the period Pa, a charge of Qma can be accumulated at the maximum to sweep the excessive charge photoelectrically converted to the substrate. Namely, Qa≦Qma. Since VSUBb is applied during the period Pb, a charge Qmb can be accumulated at the maximum. Namely, Qa+Qb≦Qmb. The concrete values of VSUBa and VSUBb are respectively about 10V and 5V, for example.

Figure 5:
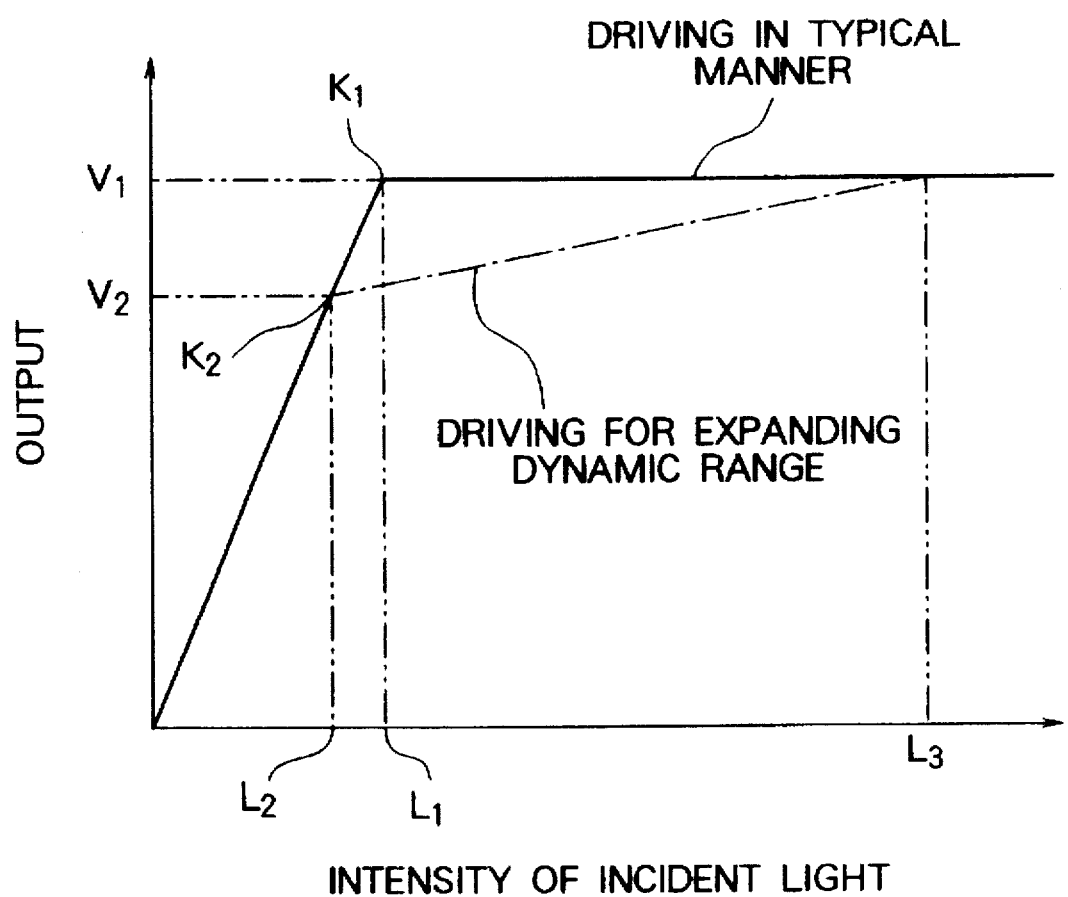
FIG. 5 is a diagrammatic illustration of a photoelectric conversion characteristics in the case where a driving method for expanding a dynamic range on the basis of FIG. 3.
Figure 9:
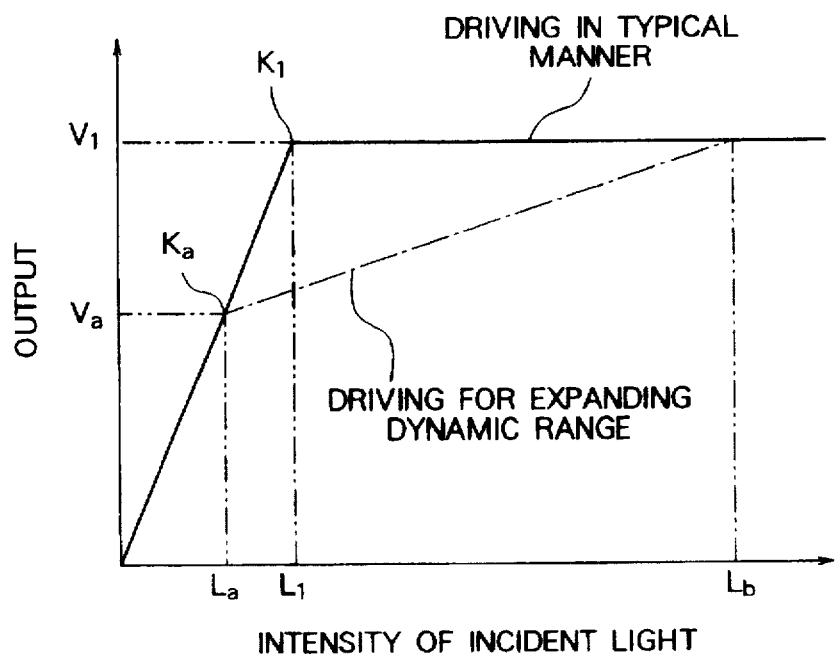
FIG. 9 is a diagrammatic illustration showing a photoelectric conversion characteristics in the first embodiment of the driving method of the solid state image pick-up device, according to the invention.

FIG. 9 is a diagrammatic illustration showing the photoelectric conversion characteristics in the first embodiment of driving method of the solid state image pick-up device according to the invention. For comparison, the characteristics in the case of typical driving is also illustrated similar to FIG. 5. A knee point Ka of a curve when the shown embodiment of driving method of the solid state image pick-up device is performed, corresponds to lower incident light intensity than the knee point K1 in the case of typical driving method. An output Va corresponding to the incident light intensity La corresponds to the maximum charge amount Qma to be accumulated in the photodiode when the substrate voltage VSUBa is applied. On the other hand, a gradient of a curve in a range of the incident light intensity between La to Lb is smaller in a rate of Pb/(Pa+Pb) as shown in FIG. 6, in comparison with the gradient of the curve in a range lower than or equal to La. Similarly to the conventional driving method for expanding the dynamic range relative to the incident light intensity, in comparison with the typical driving, an output linearly corresponded to relatively large incident light intensity can be obtained. For example, in case of FIG. 9, the dynamic range relative to the incident light intensity is expanded up to Lb.

As set forth above, with the driving method on the basis of the shown embodiment, dynamic range relative to the incident light intensity can be expanded without high speed transfer of the vertical CCD register.

In the embodiment discussed with reference to FIGS. 6 to 9, discussion is given for the case where the substrate voltages varied in two way between VSUBa and VSUBb, the method according to the present invention should not be limited to two substrate voltages.

Figure 10:
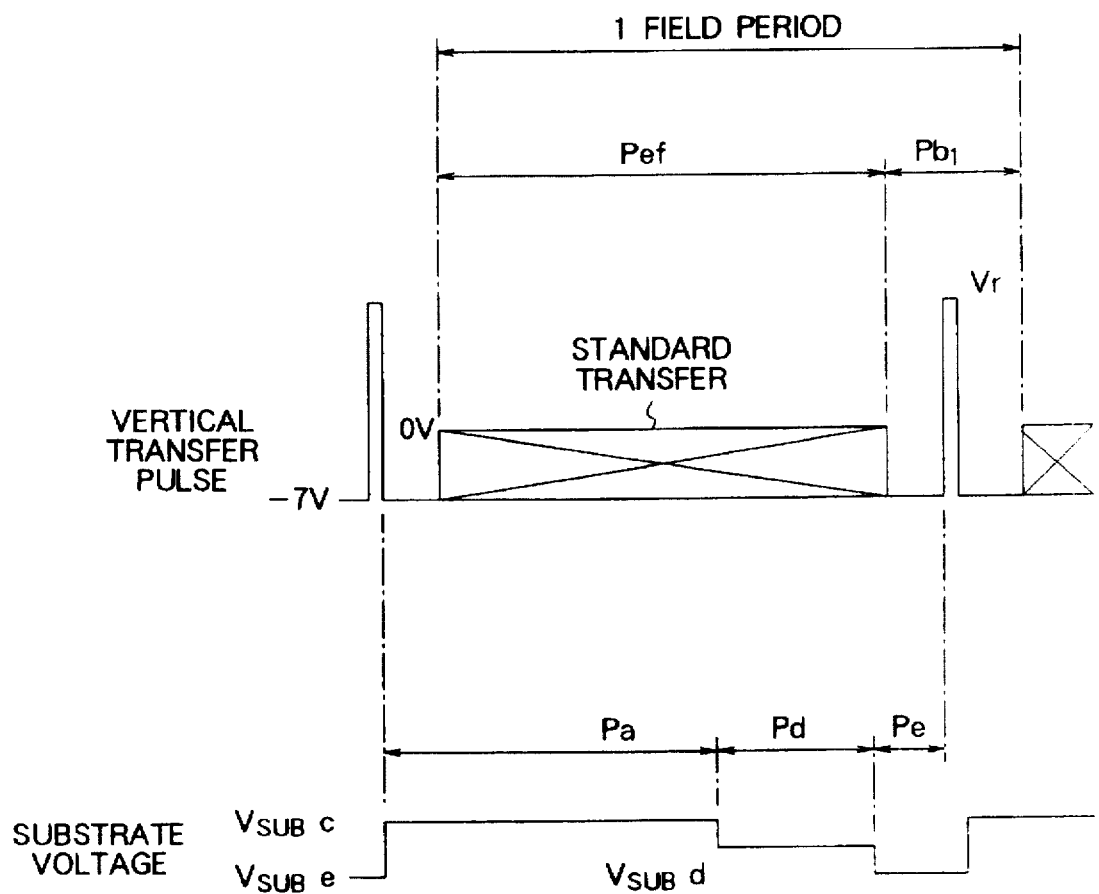
FIG. 10 is a timing chart showing a clock pulse waveform applied on a vertical transfer electrode 120 in the second embodiment of a driving method of a solid state image pick-up device, according to the present invention, and a voltage waveform applied in N-type semiconductor substrate 111.

FIG. 10 is a timing chart showing a clock pulse waveform charged on a vertical transfer electrode 120 in the second embodiment of a driving method of a solid state image pick-up device according to the present invention and a voltage waveform charged in N-type semiconductor substrate 111. In the periods Pc, Pd and Pe, respective substrate voltages VSUBc, VSUBd and VSUBe are applied.

Figure 11:
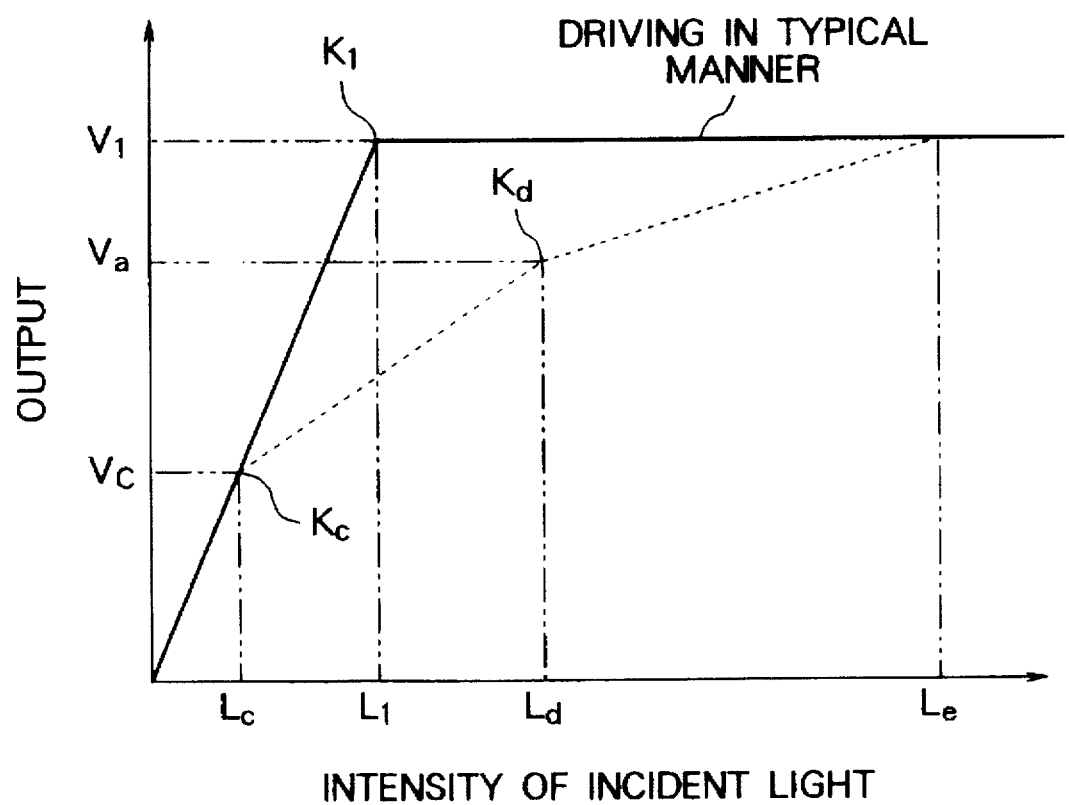
FIG. 11 is a diagrammatic illustration showing a photoelectric conversion characteristics in the second embodiment of the driving method of the solid state image pick-up device, according to the invention.

FIG. 11 is a diagrammatic illustration showing a photoelectric conversion characteristics in the second embodiment of the driving method of the solid state image pick-up device according to the invention. In the incident light intensities Lc and Ld, two knee points Kc and Kd are formed. The gradient of the curve within the range of incident light intensity between Lc to Ld is smaller than the gradient of the curve in the range lower than or equal to Lc in the rate of (Pd+Pe)/(Pc+Pd+Pe) shown in FIG. 10. Also, the gradient of the curve within the range of incident light intensity between Ld to Le is smaller than the gradient of the curve in the range lower than or equal to Lc in the rate of Pe/(Pc+Pd+Pe) shown in FIG. 10.

As set forth above, it is possible to reduce gradient of the curve as increasing of the incident light intensity. Thus, sensitivity relative to the incident light intensity range can be adjusted individually.

Figure 12:
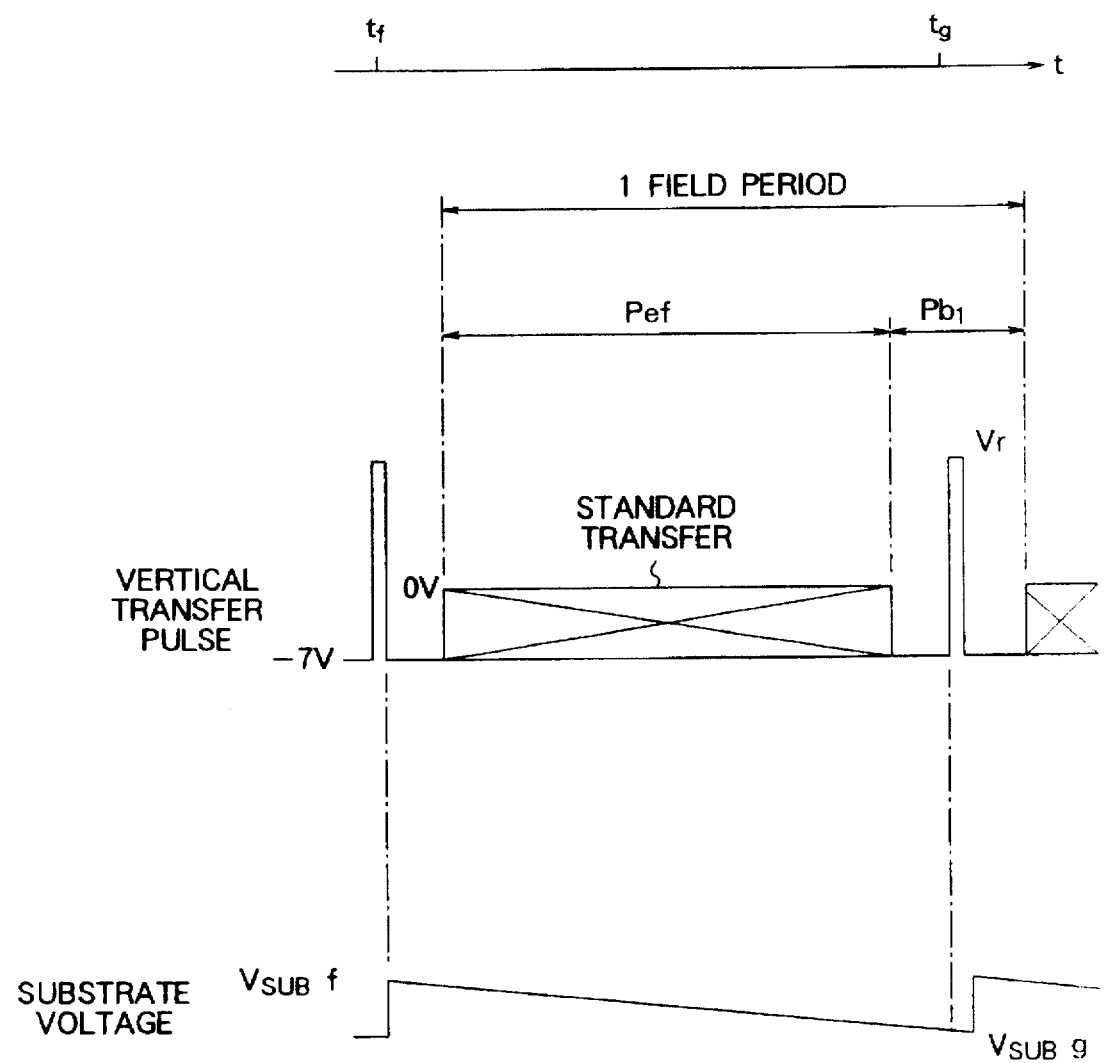
FIG. 12 is a timing chart showing a clock pulse waveform applied on a vertical transfer electrode 120 in the third embodiment of a driving method of a solid state image pick-up device, according to the present invention, and a voltage waveform applied in N-type semiconductor substrate 111.

Next, consideration will be given for the case where the charge accumulation period is divided into infinite number of periods. This is approximately equivalent to the case where the substrate voltage is varied linearly during the charge accumulation period. FIG. 12 is a timing chart showing a clock pulse waveform charged on a vertical transfer electrode 120 in the third embodiment of a driving method of a solid state image pick-up device according to the present invention and a voltage waveform charged in N-type semiconductor substrate 111. The substrate voltage is linearly varied from VSUBf to VSUBg during a period from a timing tf to a timing tg. It should be noted that during the period, in which the read out pulse Vr is charged, VSUBg is applied to the substrate.

Figure 13:
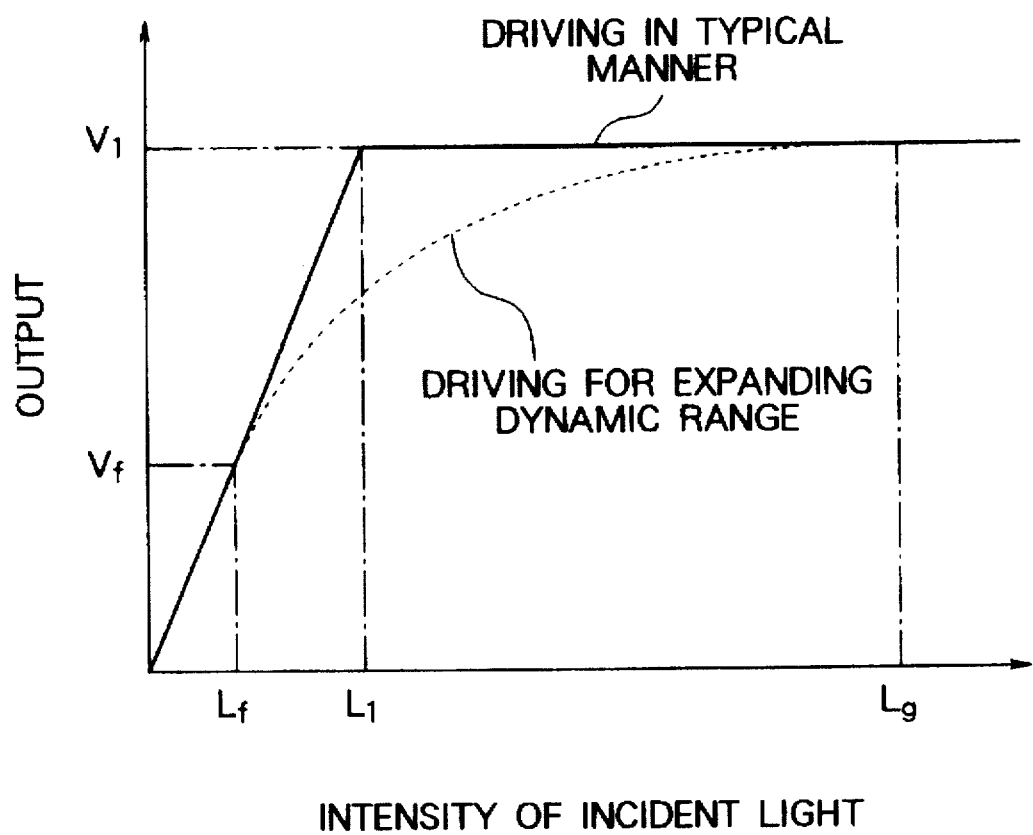
FIG. 13 is a diagrammatic illustration showing a photoelectric conversion characteristics in the third embodiment of the driving method of the solid state image pick-up device, according to the invention.

FIG. 13 is a diagrammatic illustration showing a photoelectric conversion characteristics in the third embodiment of the driving method of the solid state image pick-up device according to the invention. In the range where the incident light intensity is less than or equal to Lf, the output varies linearly similarly to the case of typical method of driving. In the range where the incident light intensity is Lf to Lg, infinite number of knee points should be present to form a smooth curve. Thus, it becomes possible to reduce the gradient as increasing of the incident light intensity for obtaining smooth curve of the photoelectric conversion characteristics. Therefore, adjustment for the sensitivity relative to the incident light intensity can be done smoothly.

On the other hand, in the driving method on the basis of the first embodiment, for example, as shown in FIG. 6, the substrate voltage is varied from VSUBa to VSUBb at the arbitrary timing tb in the charge accumulation period. In the period, in which the charge is accumulated in the photodiode, detection of the charge read out from the photodiode in the immediately preceding field is performed via the horizontal CCD register, the charge detecting portion and the output amplifier. Therefore, by variation of the substrate voltage, operation point of the output amplifier can be fluctuated or the capacity of the charge detecting portion can be fluctuated.

For example, when the voltage at the operation point of the output amplifier is lowered, an image on the reproduced image becomes dark to cause step difference in contrast to result in significant degradation of the image quality. Degradation of the image quality can be avoided by preventing variation of shape of a depletion layer in the vicinity of the output amplifier and the channel portion of the charge detecting portion, even when the substrate voltage is varied.

Figure 14A:
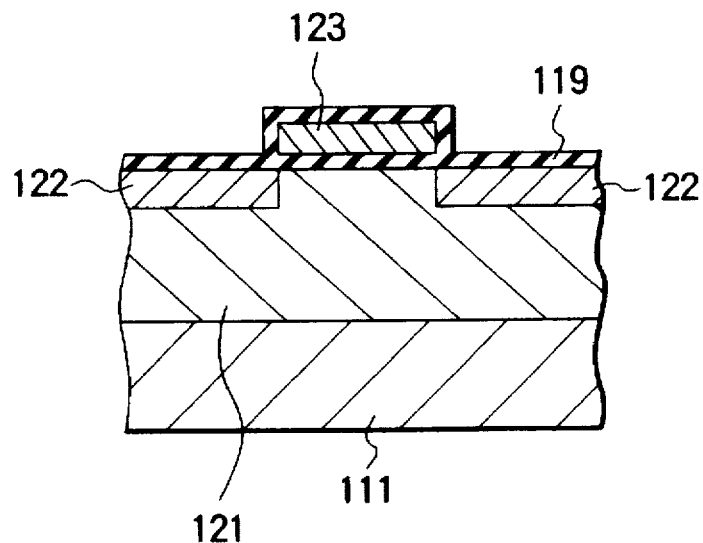
FIGS. 14A and 14B are sections of an arbitrary transistor forming an output amplifier and in the vicinity of a charge detecting portion, in the fourth embodiment of the solid state image pick-up device, according to the present invention.
Figure 14B:
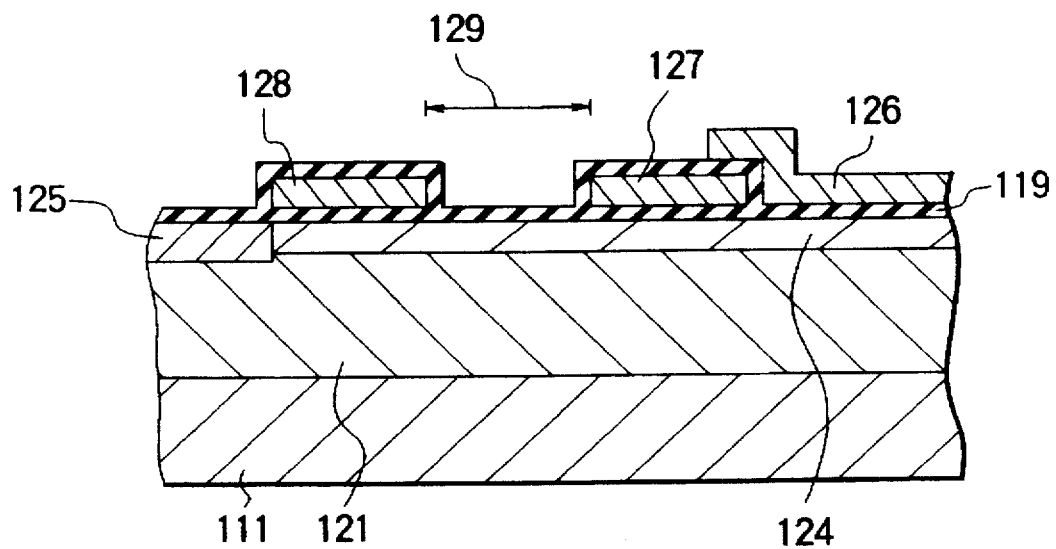

FIGS. 14A and 14B are sections of an arbitrary transistor forming an output amplifier and in the vicinity of a charge detecting portion, in the fourth embodiment of the solid state image pick-up device according to the present invention.

At first, the construction of the solid state image pick-up device will be discussed. In FIG. 14A, on one major surface of the N-type semiconductor substrate 111, a P-type impurity well layer 121 is formed. Within the P-type impurity well layer 121, N$^+$-type impurity layers 122 to be source and drain are formed. Also, via the insulative layer 119 consisted of a silicon dioxide layer, silicon nitride layer or so forth, a gate electrode 123 consisted of a polycrystalline silicon layer and so forth is formed. It should be noted that the channel below the gate electrode 123 may be formed with an impurity layer (not shown) for adjustment of a threshold voltage.

In FIG. 14B, on one major surface of the N-type semiconductor substrate 111, the P-type impurity well layer 121 is formed. Within the P-type impurity well layer 121, an N-type impurity layer 124 as a channel and a reset drain 125 consisted of N$^+$-type impurity layer are formed. Also, a horizontal transfer electrode 126, an output gate 127 and a reset gate electrode 128 consisted of polycrystalline silicon layer are formed on the N-type impurity layer 124 the reset drain 125 via the insulative layer 119 consisted of a silicon dioxide layer, silicon nitride layer or so forth. The channel portion between the output gate electrode 127 and the reset gate electrode 128, becomes a floating diffusion layer 129. A wiring between the floating diffusion layer 129 and a first stage driving transistor of the output amplifier is neglected from illustration. It should be noted that the constructions of the portions other than those set forth above, and driving method are similar to the first embodiment.

In FIGS. 14A and 14B, when an impurity concentration of the N-type semiconductor substrate 111 is about $1 \times 10^{14} \text{cm}^{-3}$, a junction depth and impurity concentration of the N-type impurity layer 124 are about 0.5 μm and about $5 \times 10^{16} \text{cm}^{-3}$, the depth of the P-type impurity well layer 121 is 5 to 10 μm, and an average concentration of the impurity in the P-type impurity well layer is $1 \times 10^{15}$ to $1 \times 10^{16} \text{cm}^{-3}$, for example, even when the substrate voltage is varied up to about 20 V, for example, the P-type impurity well layer 121 will not be depleted perfectly. Therefore, fluctuation of the operation point of the output amplifier or fluctuation of capacity of the charge detecting portion 104 will never be caused. It should be noted that, in consideration of the fact that the horizontal CCD register 103 and the charge detecting portion 104 are formed within the common P-type impurity well layer 121, to make the average concentration of the impurity of the P-type impurity well layer 121 greater than $1 \times 10^{16} \text{cm}^{-3}$ may cause degradation of transfer efficiency of the horizontal CCD register 103, and increasing the charge detecting capacity, and thus is not desirable.

Figure 15A:
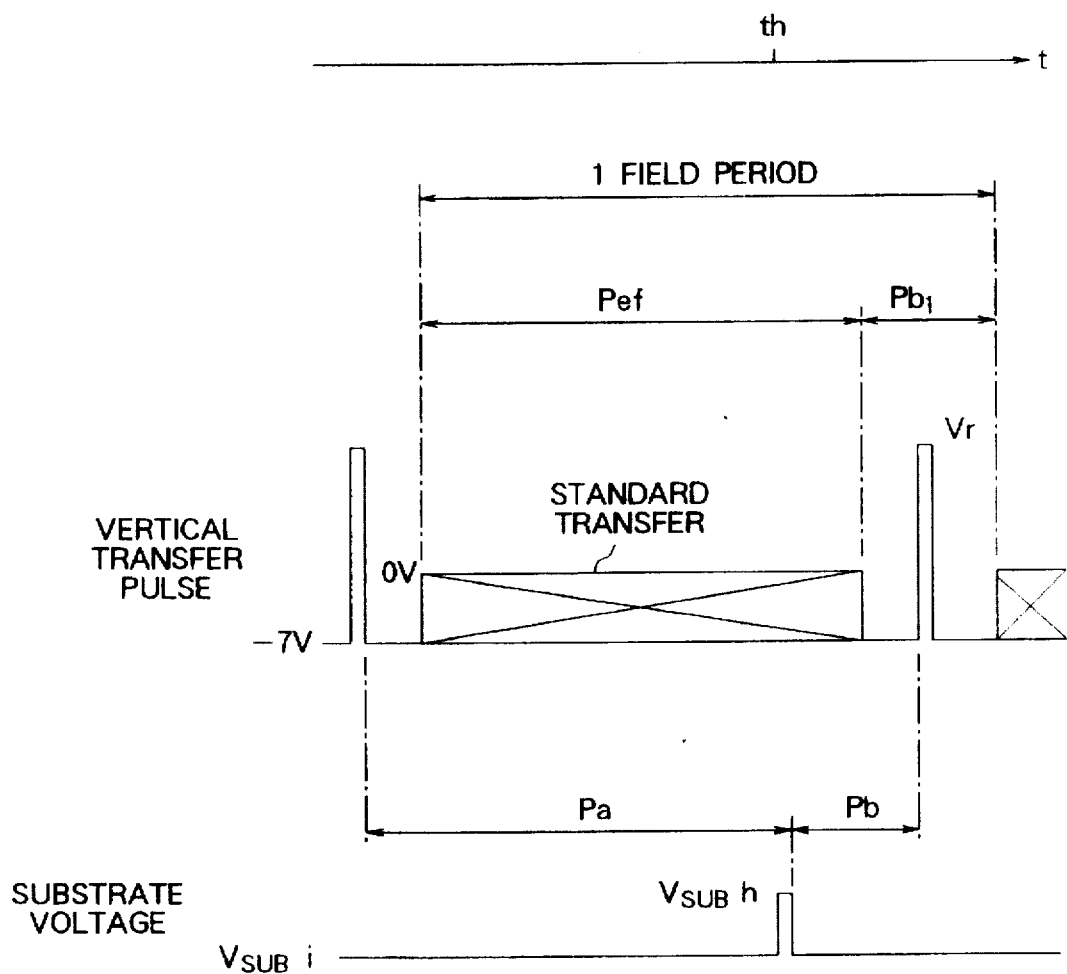
FIG. 15A is a timing chart showing a clock pulse waveform charged on a vertical transfer electrode 120 in the fifth embodiment of a driving method of a solid state image pick-up device, according to the present invention, and a voltage waveform charged in N-type semiconductor substrate 111.
Figure 15B:
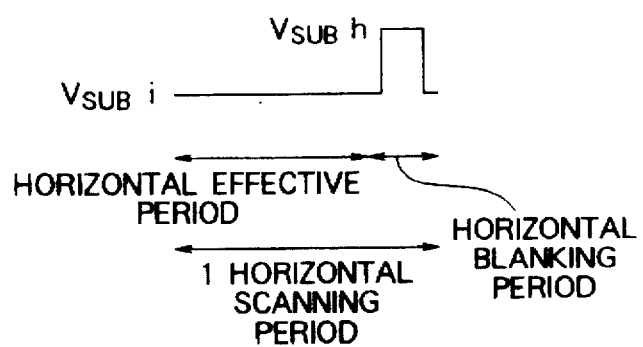
FIG. 15B is an enlarged view of the clock pulse waveform.

Next, another method for preventing step difference of contrast on the reproduced image due to variation of the substrate voltage will be discussed. FIG. 15A is a timing chart showing a clock pulse waveform charged on a vertical transfer electrode 120 in the fifth embodiment of a driving method of a solid state image pick-up device according to the present invention and a voltage waveform charged in N-type semiconductor substrate 111 and FIG. 15B is an enlarged view of the clock pulse waveform.

Sweeping of a part of charge in the photodiode 101 is performed by applying the pulse voltage VSUBh to the semiconductor substrate 111 at a timing th within a charge accumulation period. It should be noted that, as shown in FIG. 15B, this pulse is charged within the horizontal blanking period. By this, during a horizontal effective period where charge detection is performed, a constant substrate voltage VSUBi can be constantly applied. Accordingly, even when fluctuation of the operation point of the output amplifier or fluctuation of capacity of the charge detecting portion 104 is caused by applying the pulse voltage to the substrate, contrast step difference may never be caused on the reproduced image, in principle. Here, by setting the values of substrate voltages VSUBh and VSUBi to the same as VSUBa and VSUBb in FIG. 6, respectively, and setting the timing th for applying the pulse to the same timing as a transition timing from VSUBa to VSUBb, photoelectric conversion characteristics similar to FIG. 9 can be obtained.

It should be noted that as technology similar to the shown embodiment, there is a technology disclosed in Japanese Unexamined Patent Publication No. 63-105579. The technology as electronic shutter disclosed in the above-identified publication sweeps all of the charge in the photodiode to the substrate for the purpose of controlling the electrical exposure period. The shown embodiment is differentiated in that a part of charge is swept to the substrate for the purpose of expanding the dynamic range.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A driving method for driving a solid state image pick-up device including:

a first conductive type semiconductor substrate;

a second conductive type impurity well layer;

a plurality of photodiodes;

a vertical CCD register receiving a charge of said photodiodes for transferring the same;

a horizontal CCD register receiving a charge from said vertical CCD register and transferring the same;

a charge detecting portion formed within said impurity well layer and detecting the charge from said horizontal CCD register;

an output amplifier provided within said semiconductor substrate; and vertical overflow drain means for sweeping an excessive charge within respective photodiode to said semiconductor substrate, the method comprising a step of:

lowering a charge voltage of said semiconductor substrate within a period, in which a charge photoelectrically converted by said photodiode is accumulated in said photodiode, in stepwise fashion.

2. A driving method for driving a solid state image pick-up device including:

a first conductive type semiconductor substrate;

a second conductive type impurity well layer;

a plurality of photodiodes;

a vertical CCD register receiving a charge of said photodiodes for transferring the same;

a horizontal CCD register receiving a charge from said vertical CCD register and transferring the same;

a charge detecting portion formed within said impurity well layer and detecting the charge from said horizontal CCD register;

an output amplifier provided within said semiconductor substrate; and vertical overflow drain means for sweeping an excessive charge within respective photodiode to said semiconductor substrate, the method comprising a step of:

linearly lowering a charge voltage of said semiconductor substrate within a period, in which a charge photoelectrically converted by said photodiode is accumulated in said photodiode.

3. A driving method for driving a solid state image pick-up device as set forth in claim 1, wherein said charge voltage of said semiconductor substrate is lowered to a blooming restricting voltage for preventing occurrence of photodiode blooming.

4. A driving method for driving a solid state image pick-up device as set forth in claim 2, wherein said charge voltage of said semiconductor substrate is lowered to a blooming restricting voltage for preventing occurrence of photodiode blooming.

5. A driving method for driving a solid state image pick-up device including:

a first conductive type semiconductor substrate;

a second conductive type impurity well layer;

a plurality of photodiodes;

a vertical CCD register receiving a charge of said photodiodes for transferring the same;

a horizontal CCD register receiving a charge from said vertical CCD register and transferring the same;

a charge detecting portion formed within said impurity well layer and detecting the charge from said horizontal CCD register;

an output amplifier provided within said semiconductor substrate; and vertical overflow drain means for sweeping an excessive charge within respective photodiode to said semiconductor substrate, the method comprising a step of:

applying a pulse voltage to said semiconductor substrate for sweeping a part of charge in said photodiode to said semiconductor substrate during an arbitrary horizontal blanking period in a period in which a charge photoelectrically converted by said photodiode is accumulated in said photodiode, wherein said pulse voltage applied to said semiconductor substrate is higher than a blooming restriction voltage for preventing occurrence of photodiode blooming.

* * * * *